(12) United States Patent
Sasaki et al.

(10) Patent No.: US 8,098,575 B2
(45) Date of Patent: Jan. 17, 2012

(54) PACKET RELAY METHOD AND DEVICE

(75) Inventors: Hiroyuki Sasaki, Kawasaki (JP); Masayuki Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 12/232,461

(22) Filed: Sep. 17, 2008

(65) Prior Publication Data
US 2009/0116485 A1 May 7, 2009

(30) Foreign Application Priority Data

Nov. 1, 2007 (JP) ................ 2007-285297

(51) Int. Cl.
*G01R 31/08* (2006.01)
*G06F 11/00* (2006.01)
*G06F 15/173* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)

(52) U.S. Cl. ............... 370/218; 370/255; 370/395.4; 709/239

(58) Field of Classification Search ............... 370/217
See application file for complete search history.

(56) References Cited

U.S. PATENT DOCUMENTS

| 6,396,845 B1 * | 5/2002 | Sugita ............... 370/449 |
| 6,775,278 B1 * | 8/2004 | Britton et al. ......... 370/389 |
| 7,120,792 B1 * | 10/2006 | Jacobson et al. ...... 713/153 |
| 7,385,918 B2 * | 6/2008 | Takagi ............... 370/222 |
| 7,911,941 B2 * | 3/2011 | Kaneko ............... 370/220 |
| 2004/0205234 A1 * | 10/2004 | Barrack et al. ........ 709/238 |
| 2006/0245350 A1 * | 11/2006 | Shei et al. ............ 370/216 |
| 2008/0049609 A1 * | 2/2008 | Chao et al. ........... 370/218 |
| 2008/0049778 A1 * | 2/2008 | Yano et al. ........... 370/422 |

FOREIGN PATENT DOCUMENTS

| JP | 8-79268 | 3/1996 |
| JP | 2003-234749 | 8/2003 |
| JP | 2005-244672 | 9/2005 |

OTHER PUBLICATIONS

Japanese Office Action issued on Oct. 25, 2011 in corresponding Japanese Patent Application No. 2007-285297.

* cited by examiner

*Primary Examiner* — Andrew Chriss
(74) *Attorney, Agent, or Firm* — Staas & Halsey LLP

(57) ABSTRACT

A packet relay method and device in which even in the presence of a relay device between transmitting and receiving devices, a normality of a protection route can be surely confirmed is provided; A specific source address or destination address are registered, and when a route normality confirmation packet having the source address or destination address is received, the packet is transmitted to a protection route regardless of a hash operation; The registering can include link aggregation information in addition to the source address or destination address and the transmitting is made when the route normality confirmation packet consistent with both of the source address or destination address and the link aggregation information is received.

14 Claims, 14 Drawing Sheets

PACKET RELAY METHOD AND DEVICE

CROSS-REFERENCE TO RELATED APPLICATIONS

This application is related to and claims priority to Japanese Patent Application No. 2007-285297, filed on Nov. 1, 2007, in the Japanese Patent Office, and incorporated by reference.

BACKGROUND

1. Field

The present invention relates to a packet relay method and device.

2. Description of the Related Art

In a system relaying packets, normally, a redundancy is provided by establishing a protection route in addition to a working (operating) route.

Also, a link aggregation function prescribed on the Ethernet (registered trademark) is a widely utilized technology for the purpose of a bandwidth enhancement and a link redundancy, where a wide area Ethernet service offered by a carrier often uses the link aggregation function for a redundant routing, upon which a so-called one-sided link aggregation is often arranged for aggregating e.g. two physical ports (lines) to a link to restrict a transmission route to a single physical port in the form of a virtual single physical port (because of a need to strictly perform QoS control).

Also, for the confirmation of a protection route normality, a ping packet such as an ARP (Address Resolution Protocol) packet or ICMP (Internet Control Message Protocol) packet is used.

Such a conventional example will now be described referring to FIGS. 8-14. It is to be noted that while a link aggregation is not indispensable for the normality confirmation of a protection route described hereafter, an example with a link aggregation arranged will be described FIGS. 8-10 show operations for normality confirmation of a protection route by transmitting a ping packet in a packet communication system formed of a transmitting device 1, a relay device 2 and a receiving device 3.

Particularly, FIG. 8 shows a setup state of the system before transmitting a ping packet, in which the transmitting device 1 sets one-sided hashing or hash sorting in a signal processor 10 so that all main signals may pass through a working route (route B-1) (step T1).

A conventional arrangement of the signal processor 10 is shown in FIG. 11, in which the signal processor 10 is formed of a packet transmitting processor 11, a hash sorting processor 12, a link aggregation table manager 13 and a link aggregation table 14, the above setting being preliminarily made in the hash sorting (hashing) processor 12 and the packet transmitting processor 11.

Such a signal processor is provided in the relay device 2 as signal processors 10_A and 10_B having the same arrangement, each being provided for port and having the same setting as the above step T1 (step T2). Also, in the receiving device 3, signal processors 10_C and 10_D are provided for port, each having the same arrangement and the same setting as well as a common link aggregation assigned an IP address, so as to respond to a ping packet destined for the IP address (step T3).

This makes the transmitting device 1 connect to the relay device 2 with link aggregations LA1 and LA2 and the relay device 2 connect to the receiving device 3 with link aggregations LA3 and LA4.

After the setting has been made, when a MAC packet such as shown in FIG. 12 is inputted as "a main signal packet" MP (see (1) in FIG. 11) to the signal processor 10 of the transmitting device 1, the packet transmitting processor 11 in the signal processor 10 extracts from the main signal packet MP a source address SA=a and a destination address DA=b, and identifies from a port having inputted the main signal packet MP a trunk of a destination link aggregation (hereinafter occasionally referred to simply as link aggregation), corresponding to the port. This trunk LA=y ("y" is an identifying reference numeral corresponding to e.g. the link aggregation LA1 for the transmitting device 1) is transmitted to the hash sorting processor 12 as transmitting packet information (2).

The hash sorting processor 12 looks up the table 14 through the table manager 13 with the link aggregation information (3) from among the information (2) as a key, thereby acquiring "ports D and E" corresponding to the link aggregation LA=y. Having recognized the main signal packet from the transmitting information (2), the hash sorting processor 12 performs hashing or hash sorting with the source address SA and the destination address DA (or VLAN-TAG), and selects e.g. the port D as a destination port (4) to be transmitted to the packet transmitting processor 11, so that the packet transmitting processor 11 outputs (5) the main signal packet MP to the port D.

It is to be noted that while as a result of hash sorting based on a hashing operation the hash sorting processor 12 may select the port E, it is now assumed that the port D is selected based on the one-sided hashing function for the link aggregation, and that while the IP address is also looked up, it is conventionally consistent only at the receiving device 3 but otherwise inconsistent.

The port D is thus connected to a working route B-1, through which the main signal packet MP is transmitted to the signal processor 10_B of the relay device 2. Also in this signal processor 10_B, the same operation as the signal processor 10 in the transmitting device 1 will be executed. Therefore, the main signal packet MP will be sent to the signal processor 10_D in the receiving device 3 through a working route B-2.

Then, the signal processor 10_D, when its destination address is found to be consistent with the one assigned in the main signal packet MP, takes in the main signal packet MP, but otherwise passes through it.

Next, an operation at the time of transmitting "ping packet" will be described referring to FIG. 9, in which the same operation as the case shown in FIG. 8 is performed when the main signal packet MP is provided to the signal processor 10, where the ping packet is generated within the packet transmitting processor 11 of the transmitting device 1 and sent out.

Namely, the packet transmitting processor 11 of the signal processor 10 generates as a ping packet an ARP Ethernet packet shown in FIG. 13 and outputs (5) it from the protection port E preset.

Accordingly, the ARP packet is sent to the signal processor 10_A of the relay device 2 through the protection route A-1 from the port E (step T11).

The signal processor 10_A of the relay device 2 also has the same arrangement as FIG. 11, where the packet transmitting processor 11, similar to the case of FIG. 8, transmits as the transmitting packet information (2) the source address SA, the destination address DA and the trunk information "y" of the destination link aggregation LA corresponding to the port to the hash sorting processor 12.

Upon receipt of the transmitting packet information (2), the hash sorting processor 12 looks up the table 14 through the table manager 13, thereby finding from the LA read information (3) that what corresponds to the trunk LA=y of the destination link aggregation are the ports E and D.

Since the transmitting packet information (2) includes no ARP packet information similar to the case of the main signal packet, the hash sorting processor 12 performs hash sorting based on a hashing operation and outputs (5) a ping packet from the working port D (this may be the port E but assumes the port D according to the one-sided hashing function of the link aggregation as aforementioned), so that the ARP packet is transmitted to the working route B-2 (step T12).

The signal processor 10_B in the receiving device 3 having received such an ARP packet recognizes from a destination IP address within "ARP request/response" that the ARP packet is destined for the link aggregation of the processor 10_B itself, and then returns it to the route B-2 from the same port having inputted this ARP packet (step T13).

The ARP packet returned is subjected to the same signal processing as well as the hash sorting at the signal processor 10_B in the relay device 2, whereas even with the one-sided hash sorting in the example shown, at this time, the port E (protection side) happens to be selected and the packet is to be returned to the signal processor 10 of the transmitting device 1 through the protection route A_1 connected to the port E.

In the example of FIG. 9, as described above, the ping packet is returned via the same route, but is returned via a different route in the example shown in FIG. 10.

Namely, at the time of ping response shown in FIG. 10, when the signal processor 10_D of the receiving device 3 returns a ping response from the received port (step T21), and the ping response is inputted to the signal processor 10_B of the relay device 2 through the working route B-2. Since the signal processor 10_B treats even the ping packet as a main signal as described above, the ping packet is subjected to the hash sorting as with the main signal packet, so that the port D (working side) is selected according to the one-sided hash sorting and the ping packet is transmitted to the working route B-1 (step T22).

Therefore, the ARP packet having been returned through the working route B-1 is received by the signal processor 10 of the transmitting device 1 where the route confirmation is to be made (step T23).

It is to be noted that while the above description has mentioned a case where a link aggregation is arranged, a case where no link aggregation is arranged has the same operation.

Also, while an ARP packet is exemplified as a ping packet, an ICMP packet can also be mentioned as shown in FIG. 14, where an ICMP portion recognizes it as an ICMP packet and presets the IP address of the destination link aggregation, exhibiting a similar operation to the ARP packet.

As a reference example, there is a failure monitoring process system of the network for communication between node devices connected to duplexed LANs comprises a router for connecting the duplexed LAN to another LAN, and two operational/standby interfaces for communication between node devices through the duplicate LAN having a common network address with each having physical address. It also comprises a failure detector which judges that the LAN connected to one interface is normal and the LAN connected to one interface is in trouble if the response packet whose destination is the network address, and physical address of one interface is received from the router no response packet is received when a packet whose destination is router's network address and physical address is transmitted to the router from one of two interfaces (see e.g. Japanese Patent Application Publication No. 2005-244672).

As a further reference example, there is an ATM exchange apparatus wherein inside an intersecting selector connecting a former-stage function block and a latter function block of an ATM exchange, filters are provided, and ATM cells in which working or protection apparatus state information are set in an overhead area in working and protection apparatus, thereby only passing ATM cells where working apparatus state information is set by the filters (see e.g. Japanese Patent Application Publication No. 08-079268).

In the prior art example shown in FIGS. 8-10 above, when a ping packet for confirming a normality of a protection route as shown in FIG. 9 is transmitted from the transmitting device 1 and then responsively returns from the receiving device 3 through the relay device 2, the ping packet traces the identical route. However, while between the transmitting device 1 and the relay device 2 the ping packet passes through the protection route, between the relay device 2 and the receiving device 3 it does not pass through the protection route A-2, failing to confirm the normality of the protection route.

Also, in the case shown in FIG. 10, the return route of the ping packet is the same as the main signal packet, whereas since between the devices link aggregations are formed, even though the ping packet is received at a port (working side port D) different from a destination port (protection side port E), one falsely confirms or recognizes due to the one-sided hash sorting that the ping packet has been normally received (step T23), so that it is also disadvantageous in that a normality of the protection route A-2 can not be confirmed.

SUMMARY

It is accordingly an object of the present invention to provide a packet relay method and device in which even in the presence of a relay device between transmitting and receiving devices, a normality of a protection route can be surely confirmed.

In order to achieve the above-mentioned object, a packet relay method (or device) comprises: a first step of (or means) registering a specific source address or destination address; and a second step of (or means) transmitting, when a route normality confirmation packet having the source address or destination address is received, the packet to a protection route regardless of a hash operation.

Namely, when a route normality confirmation packet transmitted from a specific source address or destination address is received, the packet is transferred to a protection route regardless of a result of a hashing operation to the packet even if it is performed.

This enables a relay device of a packet to surely confirm a normality of a protection route because the route normality confirmation packet passes through the protection route without fail.

Also, the above first step (or means) may include registering link aggregation information in addition to the source address or destination address, and the second step (or means) may include transmitting, when the route normality confirmation packet consistent with both of the source address or destination address and the link aggregation information is received, the packet to the protection route.

Also, the above source address or destination address may be registered from a maintenance terminal or network management device.

Alternatively, the above source address or destination address may be automatically registered from a receiving device by using a protection route confirming request packet.

The above packet relay method (or device) may further comprise a step of (or means) automatically deleting the source address or destination address after a predetermined time has lapsed.

Also, the above packet relay method (or device) may further comprise a step of (or means) notifying a receiving result of the route normality confirmation packet to the maintenance terminal or network management device.

As the route normality confirmation packet, an ARP (Address Resolution Protocol) packet or ICMP (Internet Control Message Protocol) packet that is a ping packet may be used.

Furthermore, the above hash operation may not depend on a hash method.

The above described packet relay method and device achieves the following effects:
1) Conduction state of a protection route can be surely confirmed;
2) Conduction state of a protection route can be confirmed by targeting only a ping packet;
3) Manual setting of a source address or destination address in a designated port is eliminated;
4) Size of a table storing a source address or destination address can be decreased;
5) Conduction state of a protection route can be confirmed in a plurality of nodes or devices as well;
6) Misoperations can be reduced because the setting can be done to a plurality of nodes or devices all at once;
7) Faulted portions can be quickly specified;
8) Route confirmation can be made in a setting other than one-sided hash sorting.

BRIEF DESCRIPTION OF THE DRAWINGS

The above and other objects and advantages of this packet relay method and device will be apparent upon consideration of the following detailed description, taken in conjunction with the accompanying drawings, throughout which like reference numerals refer to like or corresponding parts and in which.

DESCRIPTION OF THE EMBODIMENTS

Embodiment [1]: FIGS. 1-4

Figure 1:
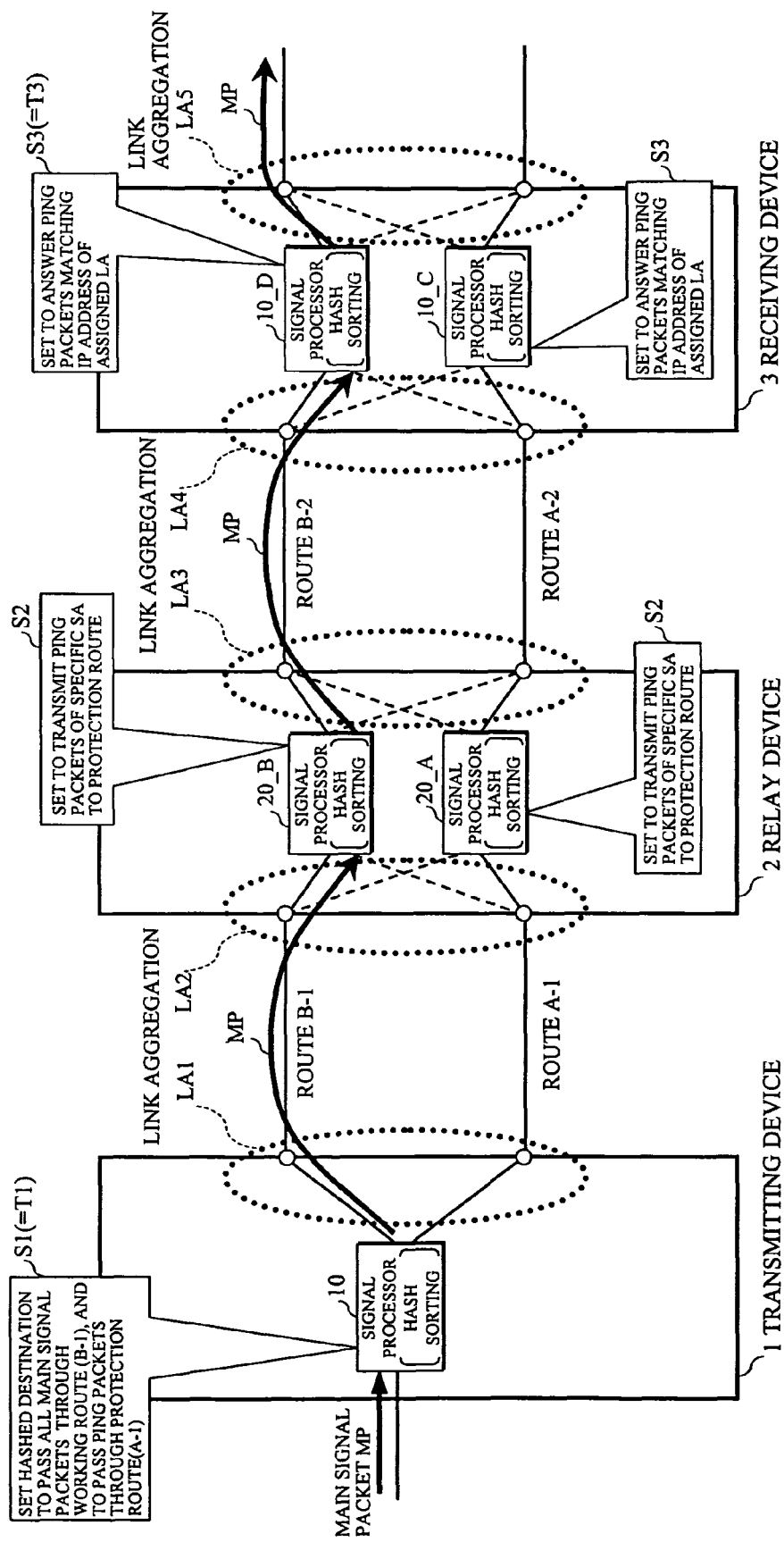
FIG. 1 is a block diagram showing an operation (before ping transmission) of an embodiment [1] of a packet relay method and device.
Figure 2:
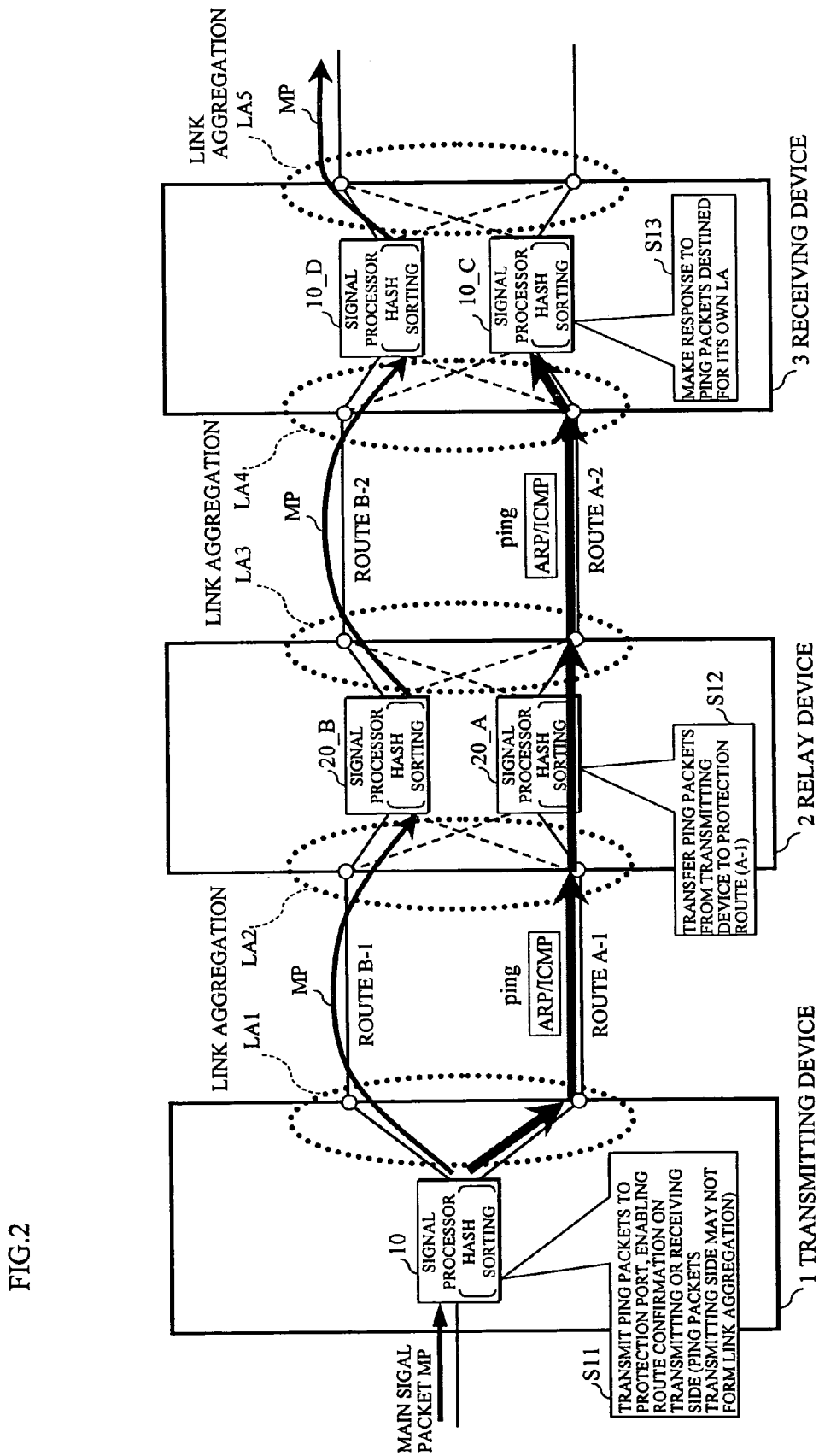
FIG. 2 is a block diagram showing an operation (during ping transmission) of an embodiment [1] of a packet relay method and device.
Figure 3:
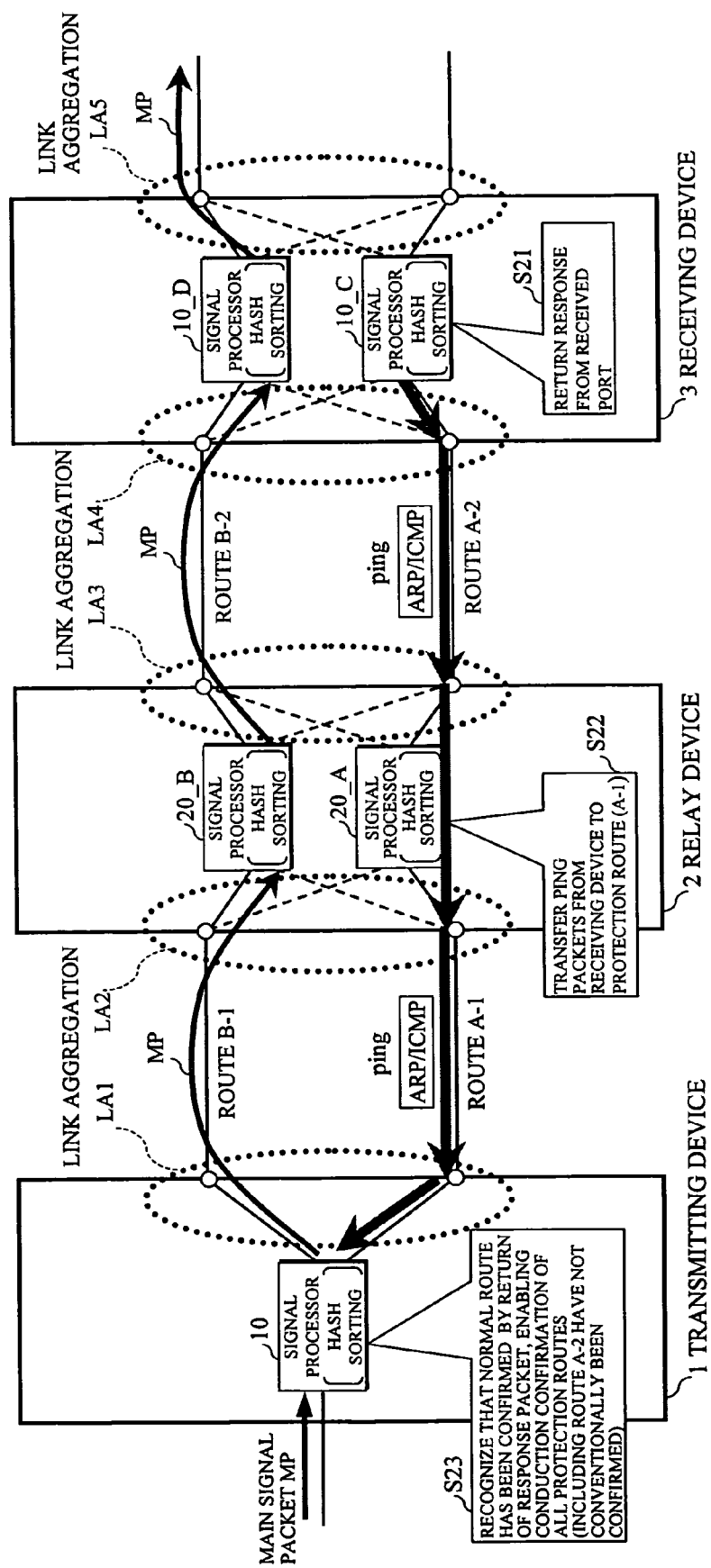
FIG. 3 is a block diagram showing an operation (upon ping response) of an embodiment [1] of a packet relay method and device.
Figure 8:
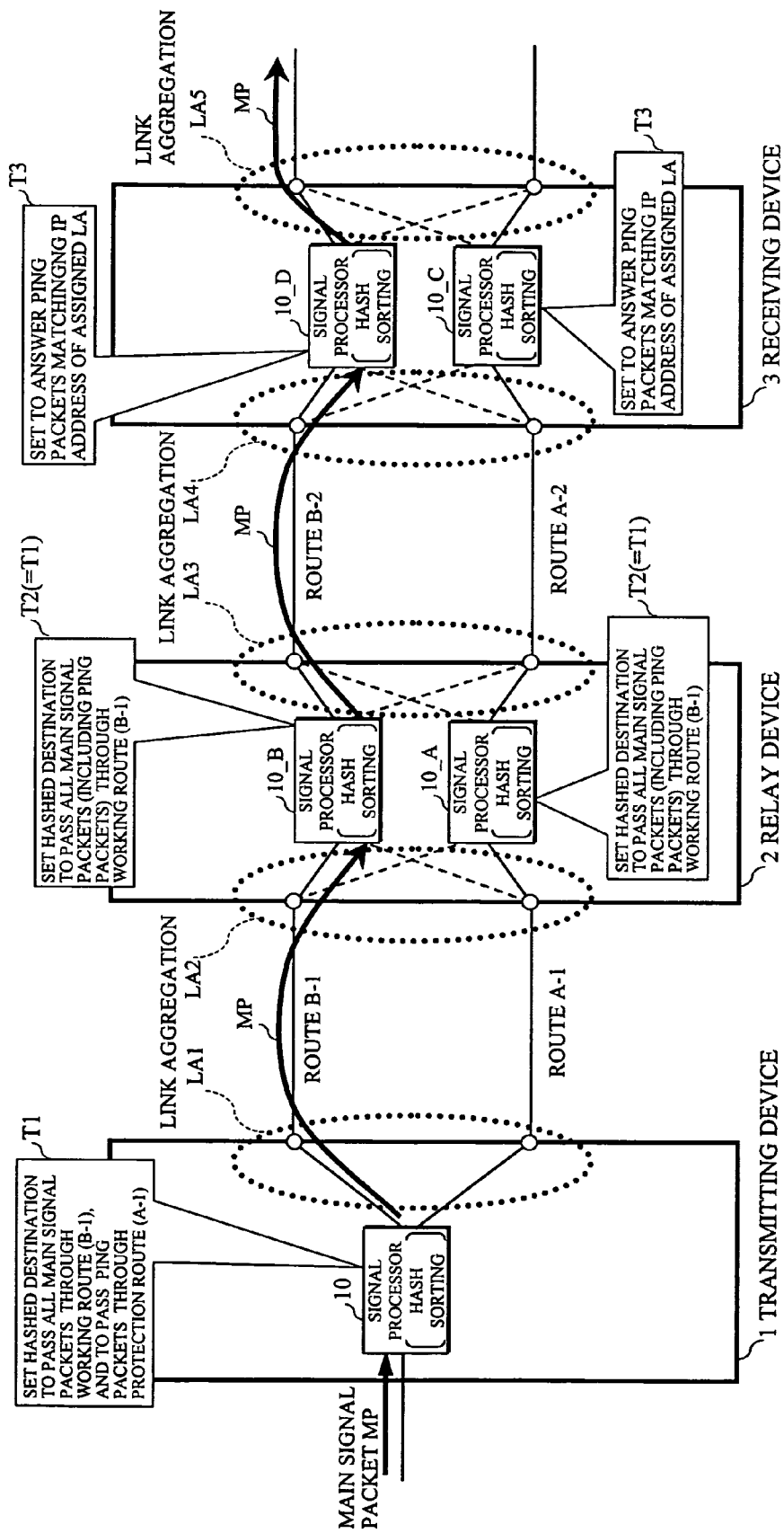
FIG. 8 is a diagram showing an operation (before ping transmission) of a prior art packet relay method and device.
Figure 9:
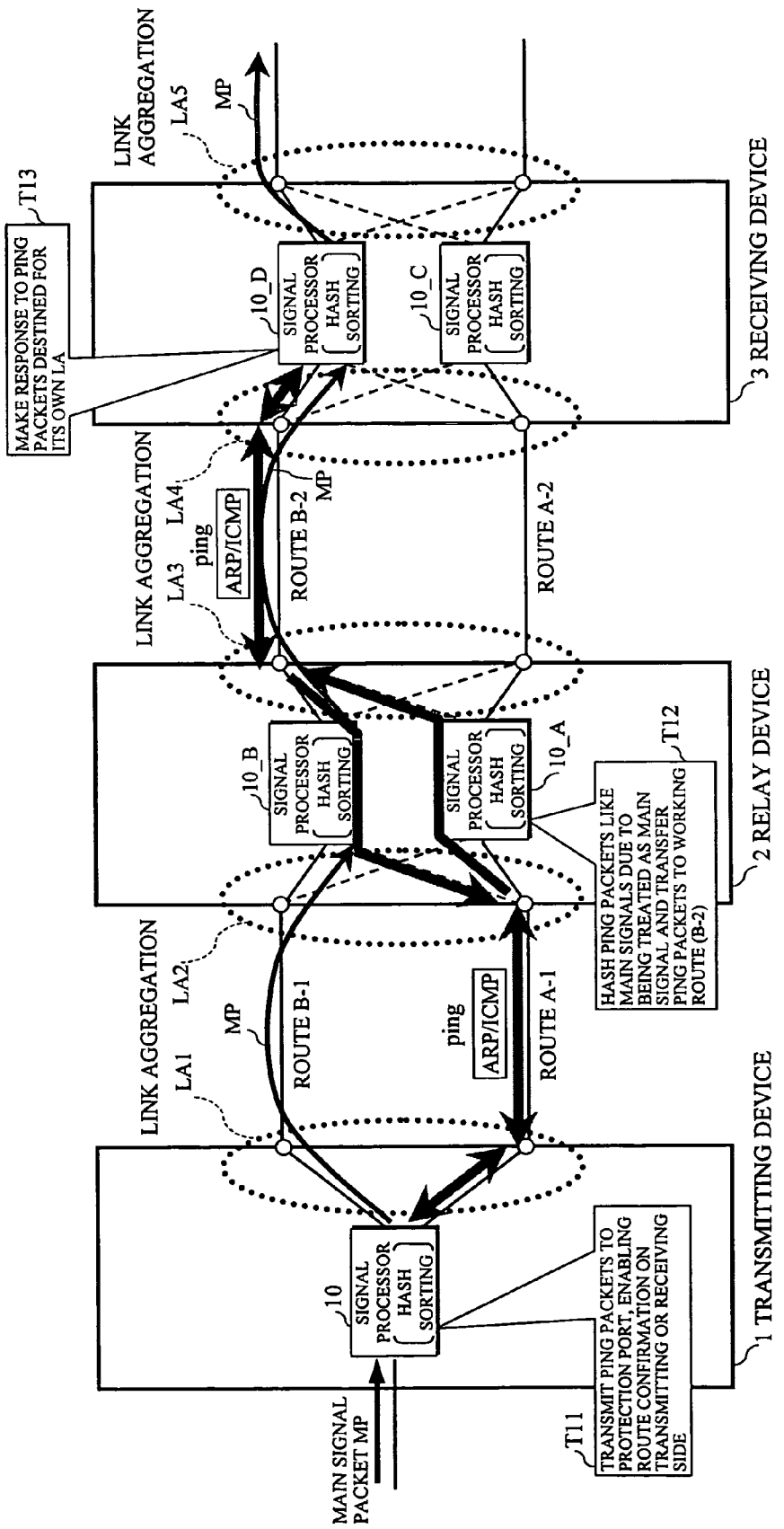
FIG. 9 is a diagram showing an operation (during ping transmission and upon ping response) of a prior art packet relay method and device.
Figure 10:
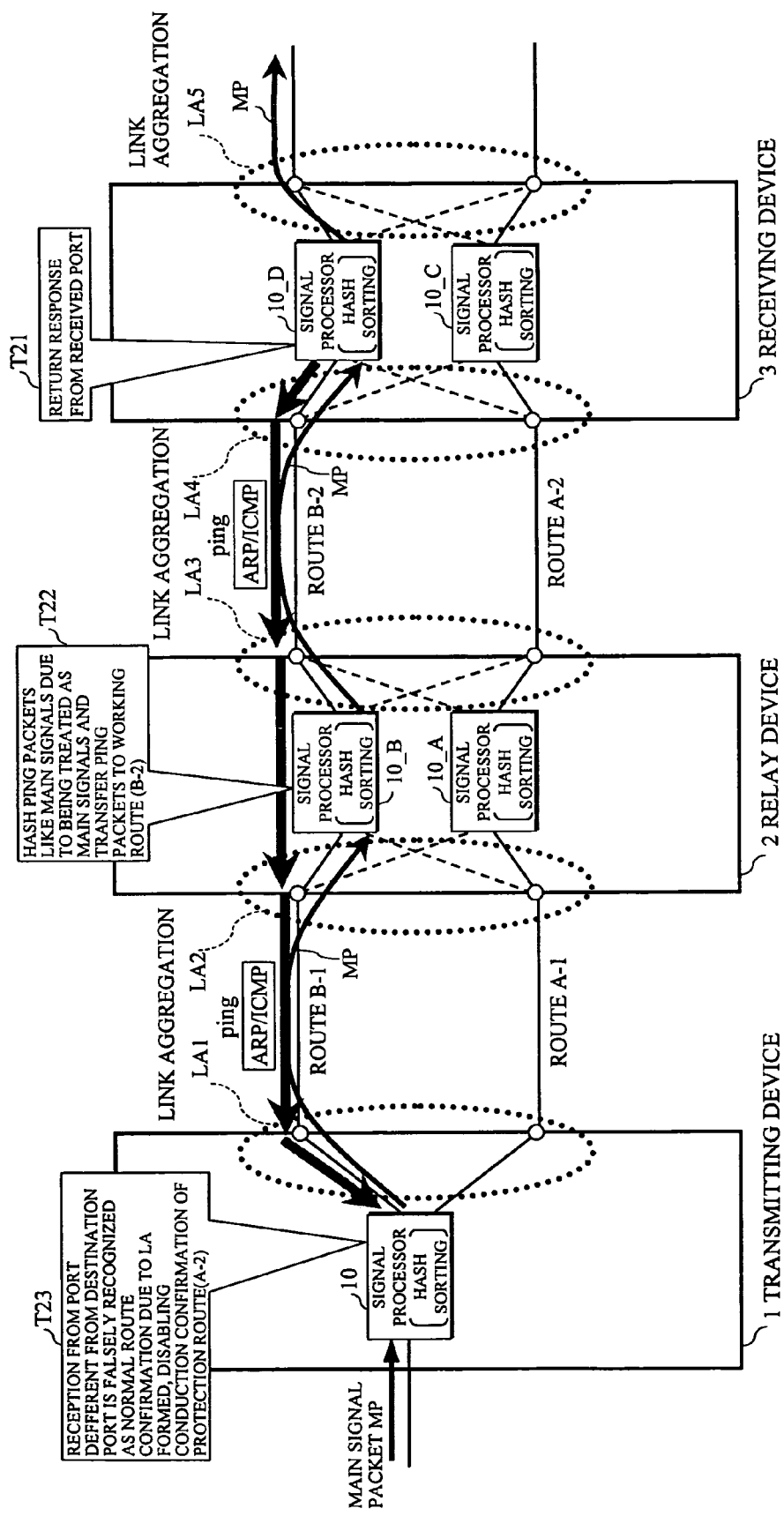
FIG. 10 is a diagram showing an operation (upon ping response) of a prior art packet relay method and device.

FIGS. 1-3 show operations of a packet communication system including a device implementing this packet relay method, each corresponding to the operations of the prior art shown in FIGS. 8-9. Therefore, for the signal processor 10 in the transmitting device 1 and the signal processors 10_C and 10_D in the receiving device 3, the arrangement shown as the above prior art may be employed.

Therefore, in an initial operation before transmitting a ping packet shown in FIG. 1, the signal processor 10 in the transmitting device 1 is set, as with step T1 shown in FIG. 8, to put the hashed destination to one-side so that the main signal packet MP may necessarily pass through the working route B-1 (step S1), and is set so that the ping packet may pass through the protection route A-1. Also, the signal processors 10_C and 10_D in the receiving device 3 are commonly set, as with step T3 shown in FIG. 8, to answer a ping packet having an address consistent with an IP address of a link aggregation assigned (step S3).

On the other hand, in the relay device 2, the signal processors 20_A and 20_B (hereinafter occasionally represented by a reference numeral 20) are set to transfer a ping packet having a specific source address SA to a protection route (step S2).

It is to be noted that while a destination address DA may be substituted for the source address SA, the following embodiment will be described by taking the source address SA as an example; also, the signal processor 20 is provided for each port, so that the relay device 2 is similarly set for both of the left and right directions; namely, the signal processor 20 is set to send the ping packet to the protection route with the address of the receiving device 3 being assumed to be a specific source address SA.

Figure 4:
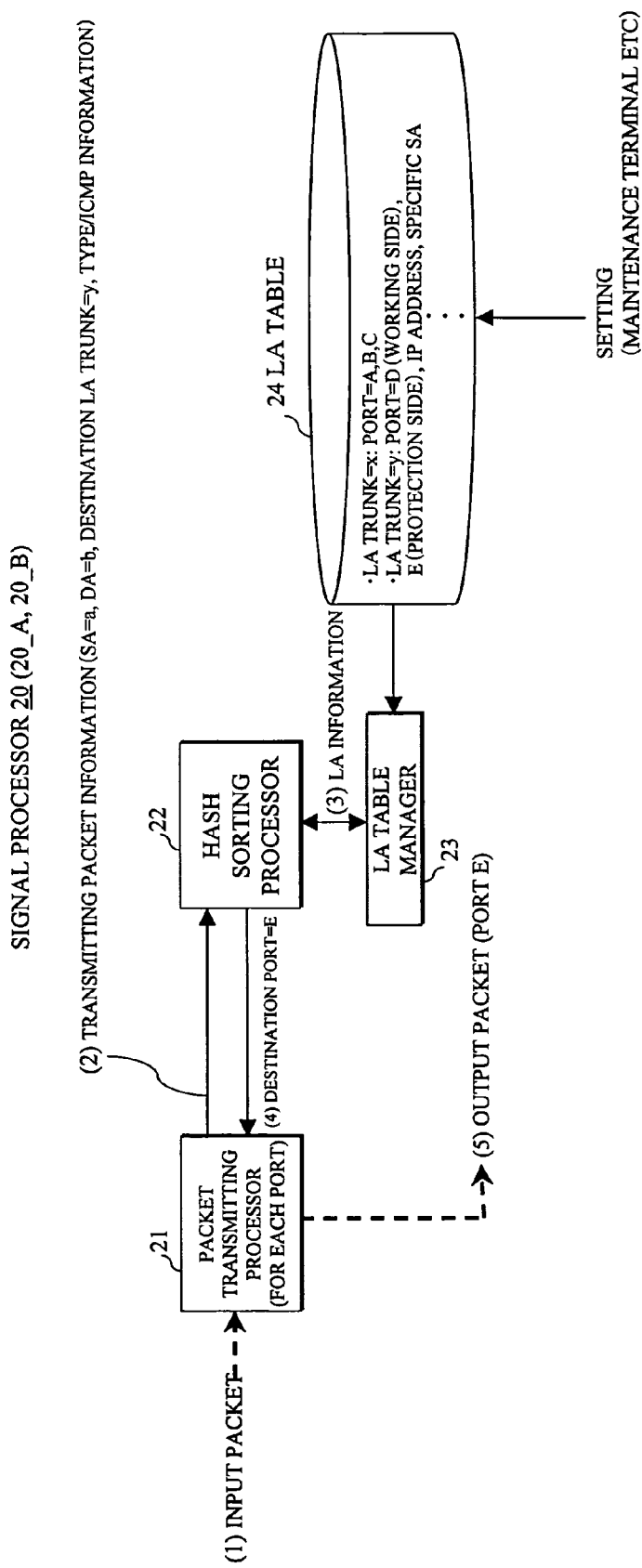
FIG. 4 is a block diagram showing an embodiment of a signal processor used in a packet relay method and device.

The signal processor 20 shown in FIG. 4, generally representing the signal processors 20_A and 20_B in the relay device 2, has a packet transmitting processor 21, a hash sorting (hashing) processor 22, a table manager 23 and a table 24, in which the table 24 has registered therein a specific source address SA from a maintenance terminal or the like, in addition to an IP address indicating a trunk of a link aggregation and a port number (indicating a working side port or a protection side port).

Figure 12:
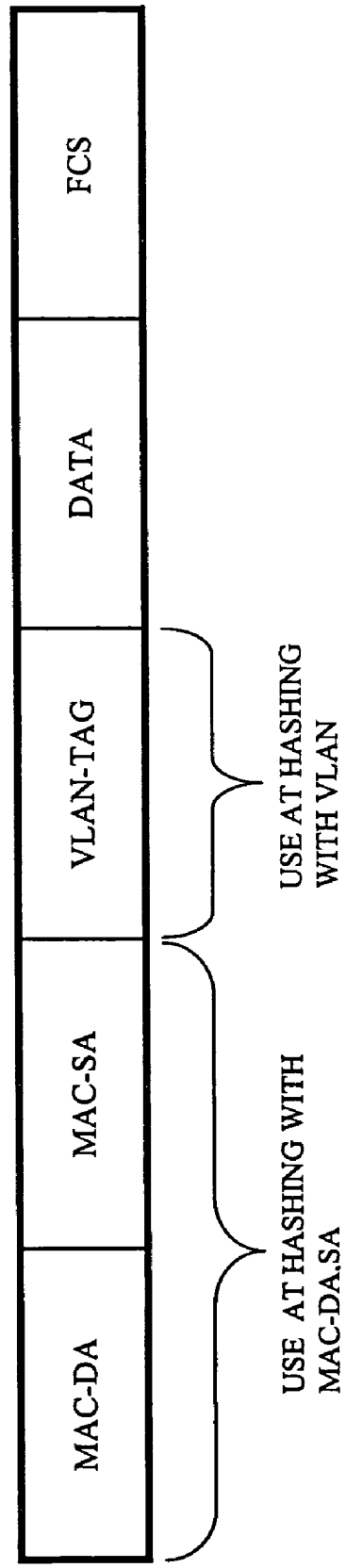
FIG. 12 is a diagram showing a format of a general MAC packet (main signal packet)
Figure 13:
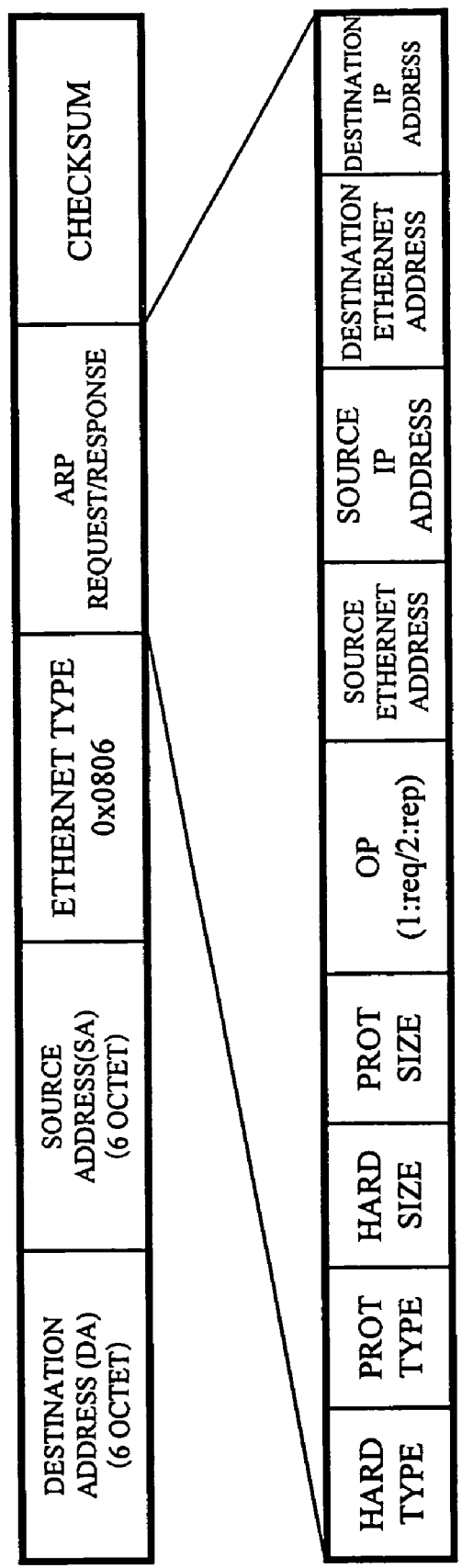
FIG. 13 is a diagram showing a format of a general ARP Ethernet packet.

In this setting condition of FIG. 1, when a main signal packet MP of a MAC packet shown in FIG. 12 or the like is given as an input to the signal processor 10 in the transmitting device 1, the main signal packet is transferred, as with the prior art in FIG. 8, to the signal processor 20_B in the relay device 2 through the working route B-1. Since the signal processor 20_B is set to transfer only the ping packet having a specific source address to the protection route, the hash sorting processor 22 in the signal processor 20_B while looking up the table 24 transfers the main signal packet MP to the signal processor 10_D in the receiving device 3 through the working route B-2 one-sided by the hash sorting.

The signal processor 10_D takes in the main signal packet when its address is consistent with the IP address or passes through it when inconsistent, as with the case of FIG. 8.

Figure 11:
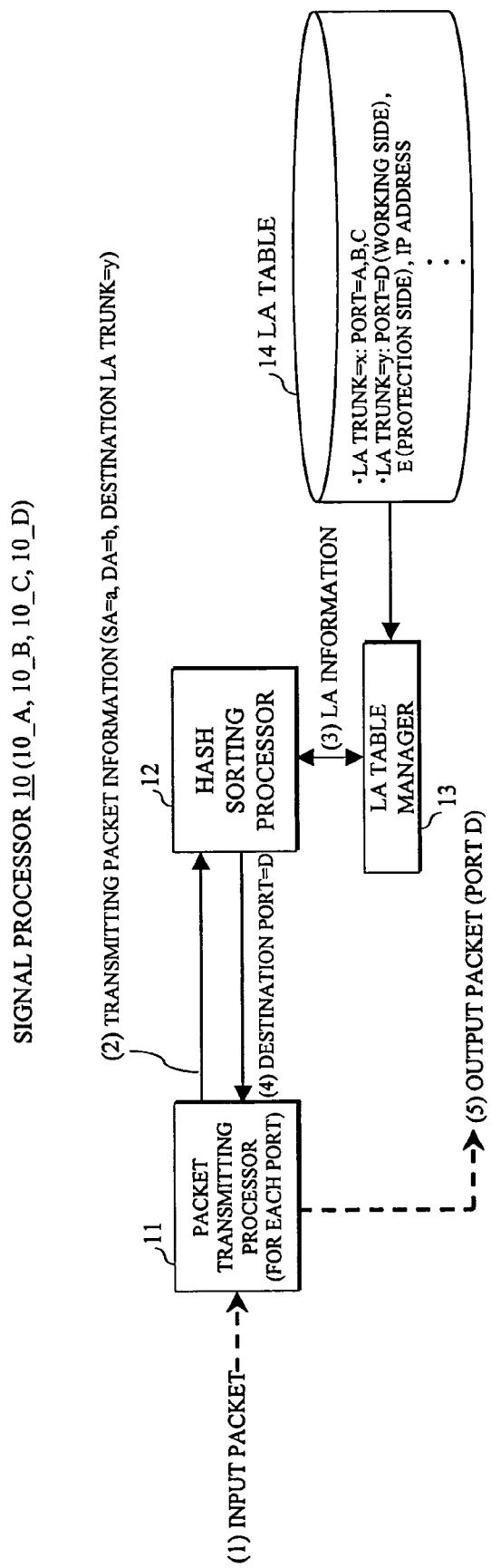
FIG. 11 is a block diagram showing an arrangement of a conventional signal processor.
Figure 14:
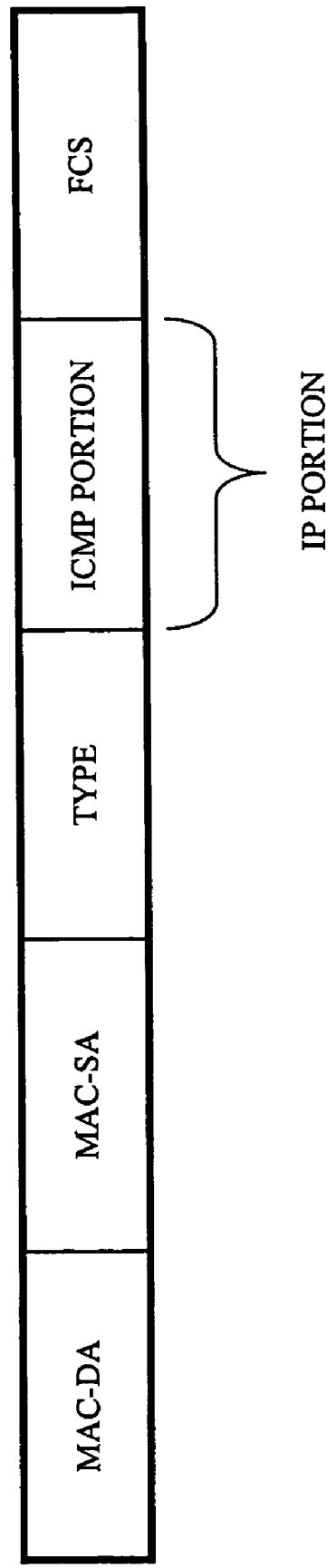
FIG. 14 is a diagram showing a format of a general ICMP packet.

On the other hand, in FIG. 2, a ping packet (e.g. ARP packet shown in FIG. 1, or an ICMP packet shown in FIG. 14) for confirming a normality of the protection route is generated, as with the case of FIG. 9, from the packet transmitting processor 11 in the signal processor 10 shown in FIG. 11, in the transmitting device 1 and is transmitted to the protection side port (E), thereby being received as an input at the signal processor 20_A provided corresponding to the protection port in the relay device 2 through the protection route A-1 (step S11).

The packet transmitting processor 21 in the signal processor 20_A extracts transmitting packet information (2) from the received ping packet (1) to be provided to the hash sorting processor 22. This transmitting packet information (2) includes a source address SA=a, a destination address DA=b, a trunk of destination link aggregation=y, type/ICMP information (type is used in case of ARP packet (0x0806); ICMP information is used in case of ICMP packet (IP portion)), and the like.

Consequently, the hash sorting processor 22 having received the transmitting packet information (2) recognizes that the input packet (1) is a ping packet, and looks up the table 24 through the table manager 23, thereby reading, as link aggregation information (3), port information corresponding to the concerned link aggregation LA=y and the specific source address SA.

When the source address SA within the ping packet is consistent with the source address SA read out of the table 24, the protection port (E) is selected as a destination port and notified to the packet transmitting processor 21, thereby providing a packet output (5) from the port E, while the ping packet is processed in the same manner as the main signal packet when the source address SA is inconsistent.

Therefore, as shown in FIG. 2, the signal processor 20_A transfers the ping packet coming from the transmitting device 1 to the protection route A-2 from the port E to be received by the signal processor 10_C of the receiving device 3 (step S12).

Then, the signal processor 10_C answers the ping packet having the IP address (destination IP address in "ARP request/response" in ARP packet, or destination IP address in "IP portion" in ICMP packet) destined for the link aggregation of its own, and returns a response from the port having received the packet as shown in FIG. 3 (step S13 in FIG. 2 and step S21 in FIG. 3).

The signal processor 20_A having received the above ping response packet from the protection route A-2 is similarly set for the opposite direction so that the ping packet coming from the receiving device 3 may also be transmitted to the protection route A-1, and therefore the ping response packet is to be returned via the route A-1 to the signal processor 10 in the transmitting device 1 (step S22).

Consequently having received the returned response packet from the transmission port E, the signal processor 10 in the transmitting device 1 can recognize that the protection route confirmation has been normally made (step S23).

Figure 5:
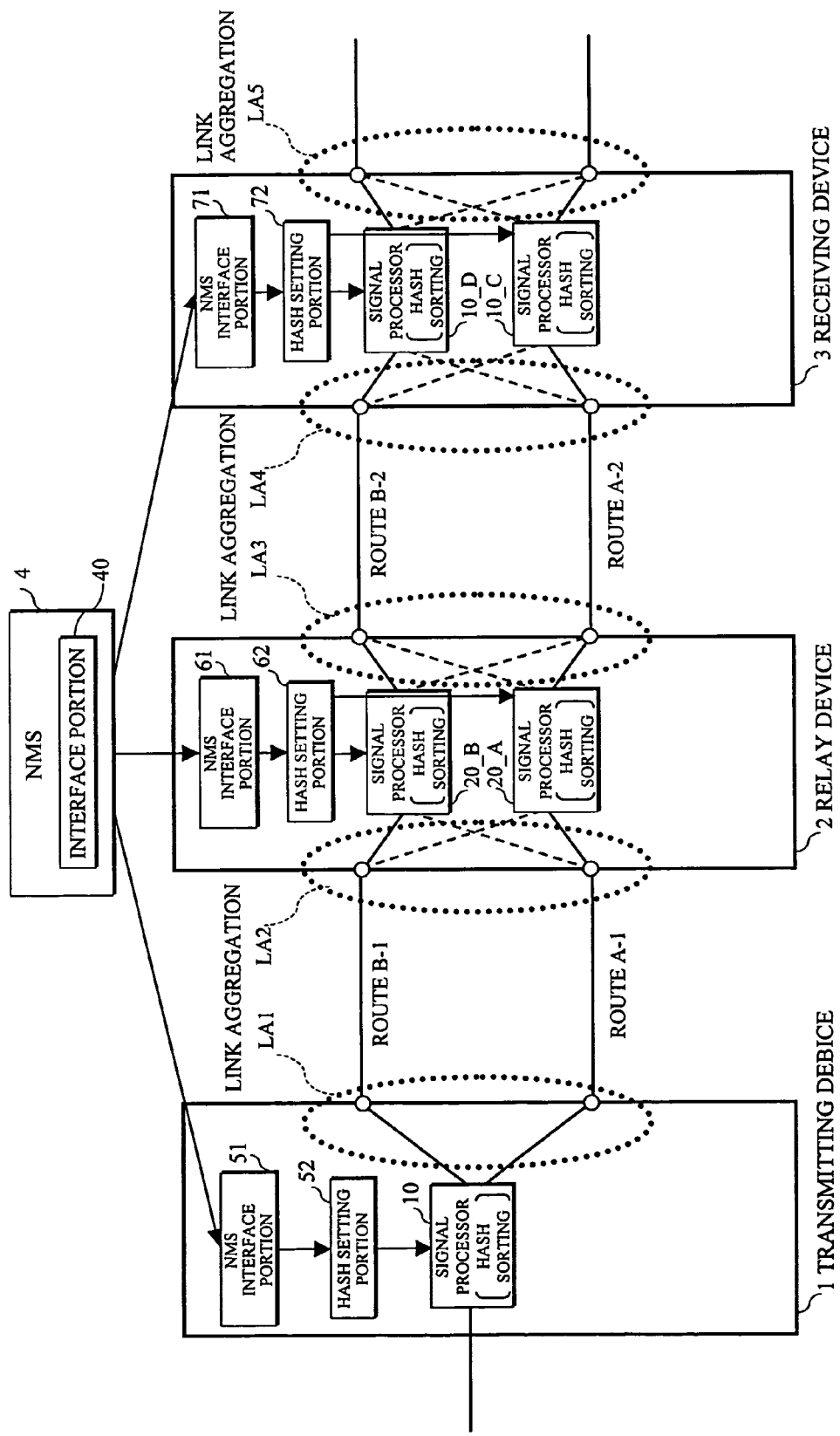
FIG. 5 is a block diagram showing an operation (upon manual setting by a network manager NMS) of an embodiment [2] of a packet relay method and device.

Embodiment [2]: FIG. 5

While the settings for the transmitting device 1, the relay device 2 and the receiving device 3 in the above embodiment [1] can be made from maintenance terminals (not shown) connected to the respective devices, in this embodiment [2] the settings are made by using a network management system (NMS) common to all of the devices 1-3.

Namely, in the transmitting device 1, from an interface portion 40 in the network management system 4 an NMS interface portion 51 and a hash setting portion 52 are connected in series with the signal processor 10; in the relay device 2, from the interface portion 40 an interface portion 61 and a hash setting portion 62 are connected in series with the signal processors 20_A, 20_B; and in the receiving device 3, from the interface portion 40 an interface portion 71 and a hash setting portion 72 are connected in series with the signal processors 10_A, 10_B.

In this case, the network management system 4 sets, for the transmitting device 1, the table 14 of the signal processor 10 from the hash setting portion 52 through the interface portion 51, similarly sets, for the relay device 2, the table 24 in the signal processors 20_A, 20_B from the hash setting portion 62 through the interface portions 40, 61, and similarly sets, for the receiving device 3, the table 14 in the signal processors 10_A, 10_B from the hash setting portion 72 through the interface portions 40, 71.

Consequently, the network management system 4 instructs the relay device 2 desiring a route confirmation to perform a protection route confirmation, so that the relay device 2 notifies the hashed destination as instructed, which is added to the link aggregation table, thereby enabling a normality of protection route to be confirmed in the same manner as the above embodiment [1].

Also, in a case where the normality confirmation is disabled due to halfway occurrences of ping packet loss, if statistic information is acquired at each port, it will be possible to identify how far the packet has arrived, so that the network management system 4 may pick up the information to specify the faulted portion to be notified to a maintenance person.

Also, by setting a designated port as a transmitting port in the presence of a plurality of protection port candidates, it becomes possible to transmit the packet from the designated port, in which it is also possible that the relay device 2 in cooperation with the network management system 4 tests the protection ports one by one automatically.

As a result, all of the routes can be confirmed for their normality of protection side.

Figure 6:
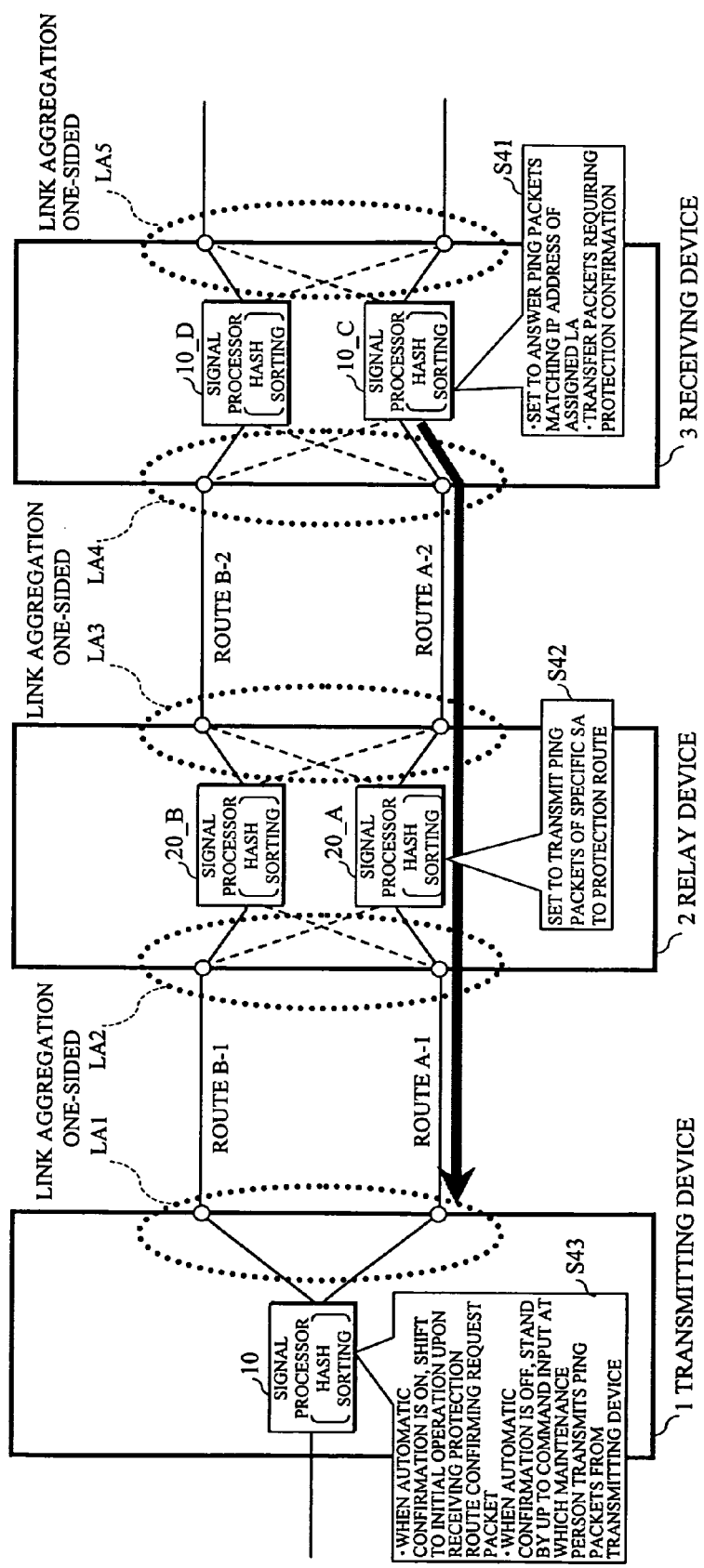
FIG. 6 is a block diagram showing an operation (upon automatic setting from a receiving device) of an embodiment [3] of a packet relay method and device.
Figure 7:
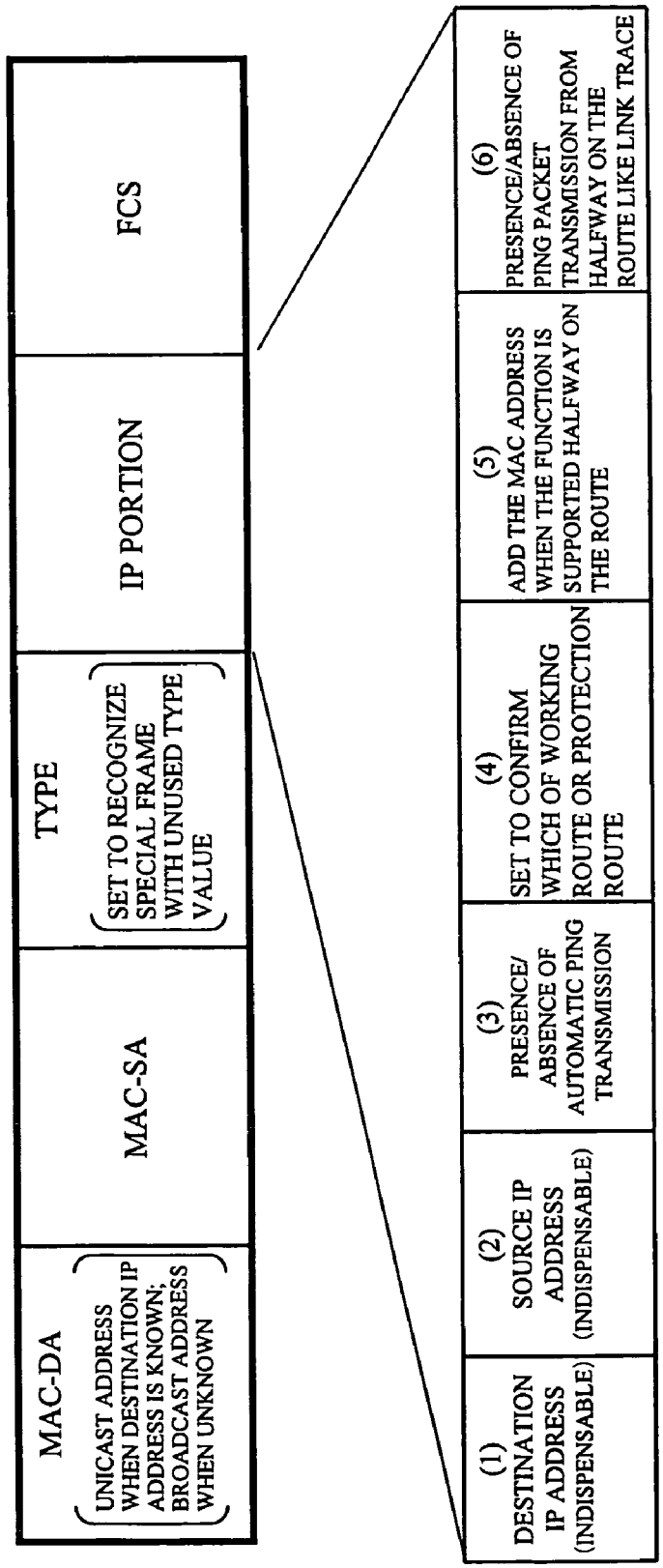
FIG. 7 is a diagram showing a format of a protection route confirming request ICMP packet used in the embodiment [3] above.

Embodiment [3]: FIGS. 6 & 7

This embodiment [3] intends to make automatic settings from the receiving device 3 instead of the manual settings in the above embodiments [1] and [2].

For this purpose, the signal processors 10_C and 10_D in the receiving device 3 transmit, when being set to answer the ping packet having an address consistent with the IP address of a link aggregation assigned as shown in FIG. 6, a packet concurrently for requesting to confirm the protection route (step S41).

A format of this protection route confirming request packet is shown in FIG. 7. This packet is diverted from the above mentioned ICMP packet (see FIG. 14), formed of a destination MAC address DA, a source MAC address SA, a type, an IP portion (ICMP portion) and an FCS (Frame Check Sequence).

"Destination MAC address" is stored with the address of the transmitting device 1 in the example shown in FIG. 6, which is a unicast address if the destination IP address of the transmitting device 1 is known, or a broadcast address if unknown. This can be applied to a case where VLAN-TAG such as a MAC packet shown in FIG. 12 is provided between the source MAC address SA and the type.

"type" serves to recognize a particular packet (not ping packet but protection route confirming packet) with an unused value.

"IP portion" is set with (1) destination address of the transmitting device 1, (2) source IP address and (3) whether or not the transmitting device 1 should automatically transmit the ping packet, and may instruct the relay device 2, (4) to select which of the working route or the protection route should be confirmed, (5) to add the MAC address if this function is supported halfway on the route (so as to recognize the existence of a device not supporting this function on a multi-staged route if any) and (6) to set the presence/absence of a ping packet transmitted from a halfway of the route. With such a packet, no ARP packet by broadcasting is necessary.

The signal processor 20_A of the relay device 2 having received such a protection route confirming request packet transmitted from the receiving device 3 is set to transmit the ping packet of a specific source address SA (MAC-SA) to the protection route (step S42), so that the signal processor 10 of the transmitting device 1 having received the ping packet through the protection route A-1 transits to the initial operation (FIG. 1) by the reception of the protection route confirming request packet in the case of automatic confirmation (3), or stands by until a maintenance person inputs a command to transmit the ping packet from the transmitting device 1 in the absence of automatic confirmation.

Thus, by setting that the receiving device 3 transmits to the transmitting device 1 and the relay device 2 through the protection route a ping packet such as an ARP packet or ICMP packet from a specific source address, it becomes possible to confirm a signal operation of a protection route.

It is to be noted that in the above embodiments, information as to a working port and a protection port within a link aggregation may be automatically acquired from a maintenance terminal or a transmitting device by protocol.

It is also to be noted that the present invention is not limited by the above-mentioned embodiments, and it is obvious that various modifications may be made by one skilled in the art based on the recitation of the claims.

The invention claimed is:

1. A packet relay method comprising:
   registering preliminarily a specific source address or destination address; and
   transmitting a received packet to a working route or a protection route according to a hash operation result when the received packet is not a route normality confirmation packet having the specific source address or destination address and transmitting the received packet to the protection route regardless of the hash operation result when the received packet is the route normality confirmation packet having the specific source address or destination address.

2. The packet relay method as claimed in claim 1, wherein the registering includes registering link aggregation information in addition to the source address or destination address, and the transmitting includes transmitting the received packet to the protection route when the received packet is the route normality confirmation packet consistent with both of the source address or destination address and the link aggregation information.

3. The packet relay method as claimed in claim 1, wherein the source address or destination address is registered from a maintenance terminal or network management device.

4. The packet relay method as claimed in claim 1, wherein the source address or destination address is automatically registered from a receiving device by using a protection route confirming request packet.

5. The packet relay method as claimed in claim 1, further comprising automatically deleting the source address or destination address after a predetermined time has lapsed.

6. The packet relay method as claimed in claim 5, further comprising notifying a receiving result of the route normality confirmation packet to the maintenance terminal or network management device.

7. The packet relay method as claimed in claim 1, wherein an ARP (Address Resolution Protocol) packet or ICMP (Internet Control Message Protocol) packet that is a ping packet is used as the route normality confirmation packet.

8. A packet relay device comprising:
   a table registering preliminarily a specific source address or destination address; and
   a packet transmitting processor transmitting a received packet to a working route or a protection route according to a hash operation result when the received packet is not a route normality confirmation packet having the specific source address or destination address preliminarily registered by the table and transmitting the received packet to the protection route regardless of the hash operation result when the received packet is the route normality confirmation packet having the specific source address or destination address.

9. The packet relay device as claimed in claim 8, wherein the table registers link aggregation information in addition to the source address or destination address, and the packet transmitting processor transmits the received packet to the protection route when the received packet is the route normality confirmation packet consistent with both of the source address or destination address and the link aggregation information.

10. The packet relay device as claimed in claim 8, wherein the source address or destination address is registered from a maintenance terminal or network management device.

11. The packet relay device as claimed in claim 8, wherein the source address or destination address is automatically registered from a receiving device by using a protection route confirming request packet.

12. The packet relay device as claimed in claim 8, wherein the source address or destination address is deleted from the table after a predetermined time has lapsed.

13. The packet relay device as claimed in claim 12, wherein a receiving result of the route normality confirmation packet is notified to the maintenance terminal or network management device.

14. The packet relay device as claimed in claim 8, wherein an ARP (Address Resolution Protocol) packet or ICMP (Internet Control Message Protocol) packet that is a ping packet is used as the route normality confirmation packet.

* * * * *